US012809204B2

(12) United States Patent
Lim et al.

(10) Patent No.: US 12,809,204 B2
(45) Date of Patent: Nov. 24, 2026

(54) DEAD FRONT PANEL FOR ELECTRONIC DEVICE

(71) Applicant: Hewlett-Packard Development Company, L.P., Spring, TX (US)

(72) Inventors: Lay Peng Lim, Singapore (SG); Yee Mei Cheng, Singapore (SG); Min Cong Chen, Singapore (SG); Yu Zhao, Singapore (SG); Scott Belliveau, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 271 days.

(21) Appl. No.: 18/687,080

(22) PCT Filed: Aug. 27, 2021

(86) PCT No.: PCT/US2021/048021
§ 371 (c)(1),
(2) Date: Feb. 27, 2024

(87) PCT Pub. No.: WO2023/027731
PCT Pub. Date: Mar. 2, 2023

(65) Prior Publication Data
US 2024/0385473 A1 Nov. 21, 2024

(51) Int. Cl.
*G02F 1/1333* (2006.01)
*G02F 1/13357* (2006.01)
(Continued)

(52) U.S. Cl.
CPC .... *G02F 1/13338* (2013.01); *G02F 1/133621* (2013.01); *G06F 3/04883* (2013.01);
(Continued)

(58) Field of Classification Search
None
See application file for complete search history.

(56) References Cited

U.S. PATENT DOCUMENTS 3,197,903 A 8/1965 Walley
2004/0201883 A1 10/2004 Kim
(Continued)

FOREIGN PATENT DOCUMENTS

KR 102058456 B1 * 12/2019 ....... G02F 1/133553
WO 2020/020694 A1 1/2020

OTHER PUBLICATIONS

NPL: Innovation Q+, by IP.com and IEEE, Results Publication Date Range: Oct. 12, 2000 to Oct. 28, 2025.*
(Continued)

*Primary Examiner* — Quang N Vo
(74) *Attorney, Agent, or Firm* — Foley & Lardner LLP

(57) ABSTRACT

A dead front panel for an electronic device includes a transparent substrate and a layer of colorant. The transparent substrate corresponds to a surface of the electronic device and has a display window area and a non-display window area. The display window area is an area through which light is emitted by a display element of the electronic device when the display element is illuminated. The layer of colorant is applied to a back surface of the transparent substrate at both the display window area and the non-display window area. A thickness of the layer in combination with a transmittance of the colorant permits visibility of the light emitted by the display element when illuminated and obfuscates visibility of the display element when not illuminated.

15 Claims, 13 Drawing Sheets

(51) Int. Cl.
*G06F 3/04883* (2022.01)
*H04N 1/00* (2006.01)

(52) U.S. Cl.
CPC ..... *H04N 1/00411* (2013.01); *H04N 1/00477* (2013.01); *H04N 1/00493* (2013.01); *H04N 1/00496* (2013.01); *G02F 2202/28* (2013.01)

(56) References Cited

U.S. PATENT DOCUMENTS

| | | | | |
|---|---|---|---|---|
| 2014/0365126 | A1* | 12/2014 | Vulcano | G01C 21/3617<br>701/538 |
| 2015/0294554 | A1 | 10/2015 | Park et al. | |
| 2018/0335552 | A1* | 11/2018 | Cheon | B32B 27/06 |
| 2020/0341306 | A1* | 10/2020 | Shi | G02F 1/1339 |
| 2021/0034100 | A1* | 2/2021 | Lesuffleur | B60K 35/22 |

OTHER PUBLICATIONS

NPL: InnovationQ+ by IP.com and IEEE: Results Publication Date Range: Oct. 10, 2002 to Sep. 12, 2025.*

* cited by examiner

DEAD FRONT PANEL FOR ELECTRONIC DEVICE

BACKGROUND

Electronic devices include consumer, industrial, and business devices, such as computing devices, peripheral devices, and other types of electronic devices. Electronic devices often include displays by which they display information to users of the devices. The displays can include large or small flat-panel displays (FPDs), including liquid crystal displays (LCDs) and organic light-emitting diode (OLED) displays. The displays also can include light-emitting units, such as individual light-emitting diodes (LEDs), as well as segmented LCDs and LED displays made up of selectively illuminable segments to display characters and rudimentary graphics.

DETAILED DESCRIPTION

Figure 1:
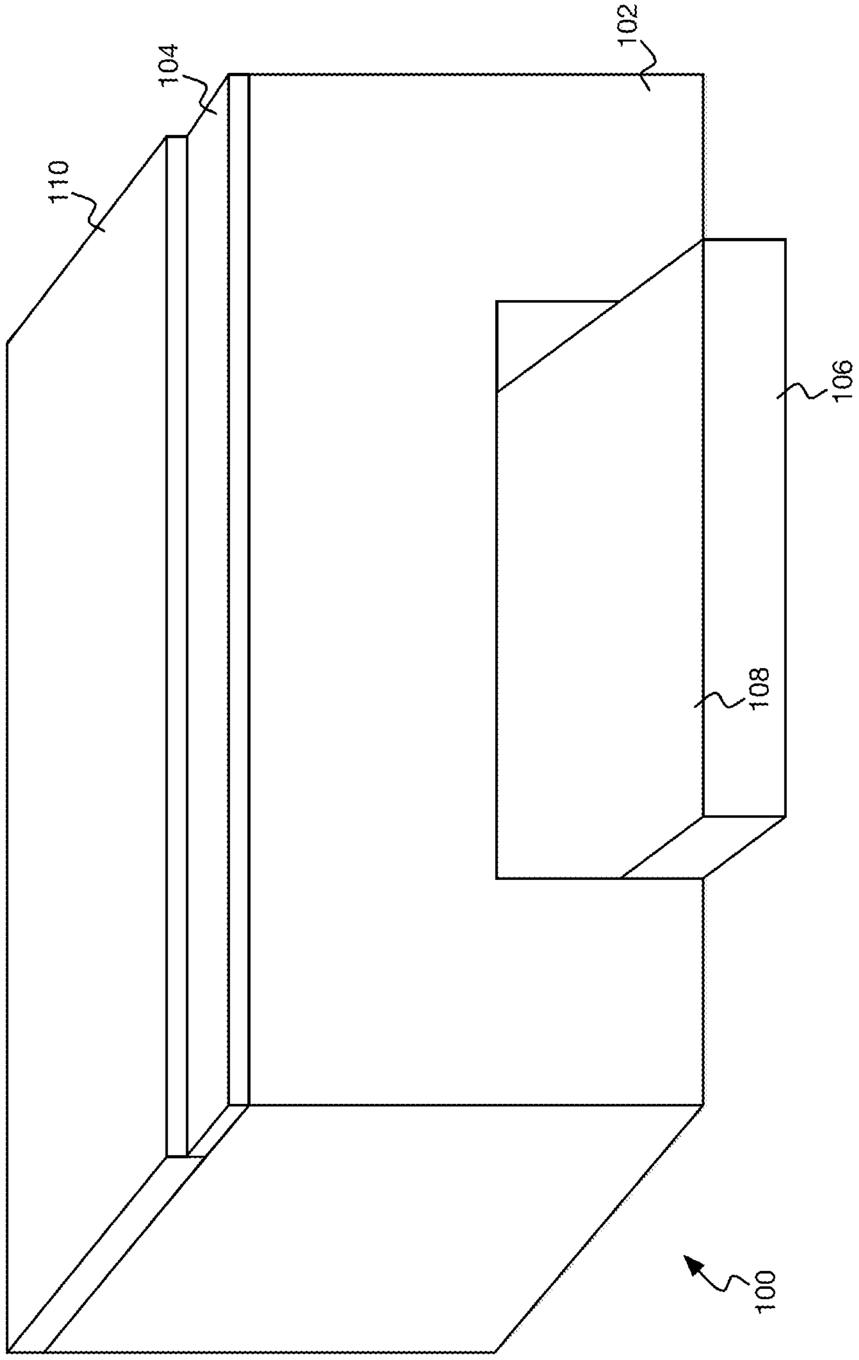
FIG. 1 is a perspective view diagram of an example electronic device having a dead front panel.

As noted in the background, electronic devices often have displays by which they display information to users. For example, a printing device, such as a standalone printer or an all-in-one (AIO) device that in addition to printing functionality includes other functionality like scanning, copying, and/or faxing functionality, may include a variety of different types of displays. There may be a flat-panel display (FPD) that shows status information regarding the printer, where the FPD may or may not be a touchscreen that also receives user input. There may further be individual light-emitting units to indicate operational status of the printing device, such as whether the printing device is on, is low on print material, and so on.

A display of an electronic device may be in the form of a dead front display, in which a display element such as an FPD, light-emitting unit, etc., is positioned under an overlay panel referred to as a dead front panel. When a display element under the dead front panel is illuminated, the display element is visible through the panel. However, when the display element is not illuminated, no part of the display element is visible through the dead front panel. The dead front panel obfuscates visibility of the display element when the element is off, and permits visibility of the display element when the element is on.

Dead front panels provide a clean, flat aesthetic to electronic devices. The dead front panels can match the color of the enclosures of the electronic devices to which the panels are attached, for instance. If the user input controls of an electronic device are touchscreen display elements, usage of a dead front panel makes the electronic device appear as if it has no such controls when the device is off. Furthermore, just the controls operable by a user may be illuminated, simplifying user interaction with the electronic device, instead of presenting the user with a large number of controls that may not all be relevant to the user at a given time.

Dead front panels, particularly those that overlay touchscreen display elements, can be relatively expensive to manufacture, however, precluding their usage in electronic devices that have cost constraints. If a dead front panel does not adequately obfuscate visibility of the display elements when the elements are not illuminated, the dead fronting effect is lost. By comparison, if a dead front panel does not adequately permit visibility of the display elements when the elements are illuminated, user experience of the electronic device is degraded.

In the case of touchscreen display elements, a dead front panel has to be as thin as possible and positioned as close to the elements as possible, with minimal or no air gap between the elements and the panel, to ensure good user experience of the electronic device. If the dead front panel is not thin enough or is not positioned close enough to the touchscreen display elements, the sensitivity of the touchscreen to user input may decrease and/or the clarity of the display elements may decrease, degrading user experience. If there is too large of an air gap between the dead front panel and the display elements, the dead front panel may flex when receiving user input, also degrading the user experience and potentially impairing long-term reliability of the device. Indeed, in light of these difficulties, dead front panels have not been employed in conjunction with touchscreen display elements that specifically include addressable pixel-based display elements, such as FPDs like liquid crystal displays (LCDs) and organic light-emitting diode (OLED) displays.

Dead front panels are described herein that balance the aforementioned constraints while also being relatively low in cost, both in their materials and their manufacture. The described dead front panels sufficiently obfuscate visibility of the display elements when the elements are not illuminated, while adequately permitting their visibility when the display elements are illuminated. In the case of touchscreen display elements, the described dead front panels are sufficiently thin and are positioned sufficiently close to their underlying display elements, with a minimal air gap between the elements and the panels, to not impair the user experience of the electronic devices of which the panels are a part. As a result, dead front panels can be employed in conjunction with touchscreen display elements that include addressable pixel-based display elements, which heretofore has generally not been possible.

FIG. 1 shows an example electronic device 100. The electronic device 100 includes an enclosure 102, which may also be referred to as a housing, case, or cover. The electronic device 100 includes a dead front panel 104 mounted to the enclosure 102. In the example, the electronic device 100 is specifically an AIO device having printing functionality and scanning functionality, and which may also have copying and/or faxing functionality.

As such, the electronic device 100 can include an input tray 106, which may also be referred to as a print media cassette, and in which print media such as paper can be loaded for printing by the device 100. The electronic device 100 can include an output tray 108, which may be the top surface of the input tray 106, onto which print media such as paper is output after having been printed on by the device 100. The electronic device 100 can include a scanning lid 110 that is upwardly rotatable to place a document for scanning by the device 100.

The electronic device 100 is more generally any type of electronic device that can display information to a user. The electronic device 100 may be a standalone printer, in which case the device 100 may lack the scanning lid 110. The electronic device 100 may be a standalone flatbed scanner, in which case the device 100 may lack the trays 106 and 108. The electronic device 100 may be a peripheral device that is not a printing device that can print on print media or an imaging device that can scan documents. The electronic device 100 may be a computing device, such as a desktop, sever, laptop, or notebook computer, a smartphone, a tablet computing device, or another type of computing device. The electronic device 100 may be another type of electronic device as well.

Figure 2A:
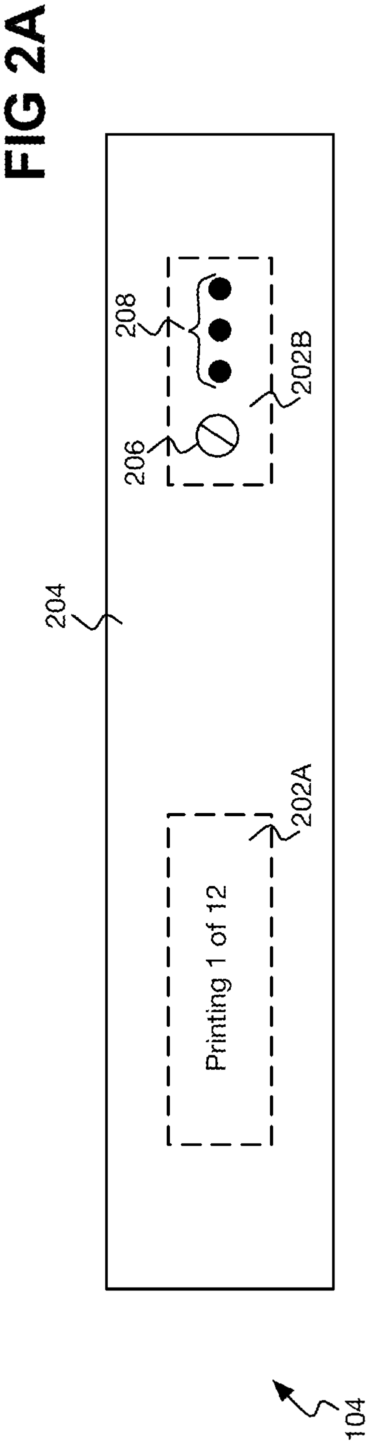
FIGS. 2A and 2B are diagrams of an example dead front panel of the electronic device of FIG. 1 when display elements of the device are illuminated and not illuminated, respectively.
Figure 2B:
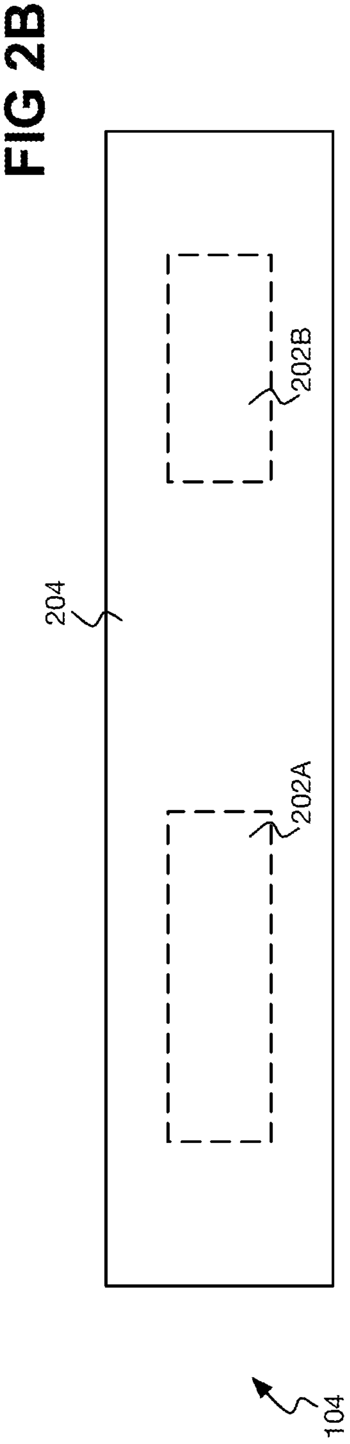

FIGS. 2A and 2B show the example dead front panel 104 in detail. The dead front panel 104 has display window areas 202A and 202B, which are collectively referred to as the display window areas 202, and one or multiple non-display window areas 204, which include any area of the dead front panel 104 that is not a display window area 202. The display window areas 202 are areas of the electronic device 100 through which light is emitted by a display element of the device 100 when the element is illuminated. The non-display window area 204 is an area through which no light is or should be emitted by a display element of the device 100 when the element is illuminated. In FIG. 2A, the display elements are illuminated, whereas in FIG. 2B, the display elements are not illuminated.

In FIG. 2A, the display element of the electronic device 100 that emits light through the display window area 202A is specifically an addressable pixel-based touchscreen display element, such as an FPD, which has been illuminated to show status information regarding the device 100. For example, the status information may denote the operation that the electronic device 100 is currently performing, such as "Printing 1 of 12" pages as shown in FIG. 2A. The display elements that emit light through the display window area 202B are specifically light-emitting units such as individual LEDs that have been illuminated. In FIG. 2A, one touchscreen display element that emits light through a preprinted icon or graphic 206, such as a stop symbol that the user can select to stop printing, whereas the other light-emitting units may emit light in filled circle manner, per reference number 208.

Therefore, in FIG. 2A, the dead front panel 104 permits visibility of the light that is emitted through the display window areas 202 by respective display elements of the electronic device 100 when the display elements are illuminated. By comparison, in FIG. 2B, the display elements are not illuminated, and the dead front panel 104 obfuscates visibility of the display elements through the display window areas 202. That is, the display elements are effectively hidden and seem to disappear from view through the dead front panel 104 when the elements are not illuminated. From the perspective of the user, the electronic device 100 does not appear to have any ability to show information at the dead front panel 104 when the display elements are not illuminated.

Figure 3A:
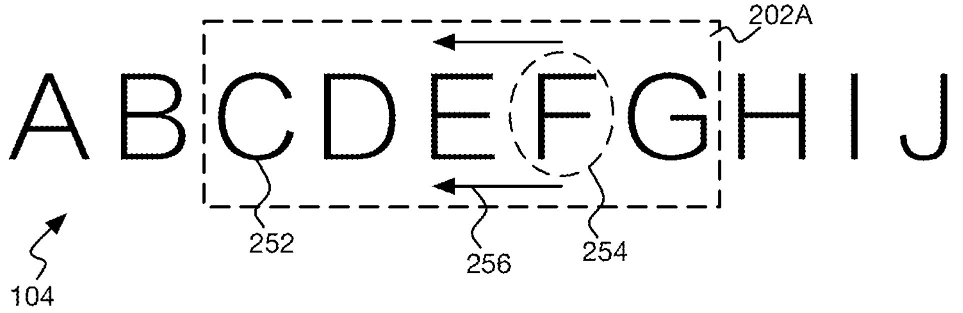
FIGS. 3A and 3B are diagrams of example usage of the dead front panel of FIGS. 2A and 2B in which information displayed by a pixel-based touchscreen display element within the display window area of the panel can be scrolled via a swiping gesture.
Figure 3B:

FIGS. 3A and 3B are diagrams of example usage of the dead front panel 104 in which information displayed by a pixel-based touchscreen display element within the display window area 102A of the panel 104 can be scrolled via a swiping gesture. As noted, the dead front panel 104 described herein permits usage of such pixel-based touchscreen display elements. As a result, user interaction with the display element through the dead front panel 104 can be achieved to provide for the usage of FIGS. 3A and 3B.

In FIG. 3A, there are a row of graphical icons 252 represented by letters A-J. However, the size of the icons 252 and the size of the display window area 202A and its underlying pixel-based touchscreen display element permits just five of the icons 252 to be visible at any given time. In FIG. 3A, for instance, the C, D, E, F, and G icons 252 are visible within the display window area 202A, whereas the A, B, H, I, and J icons 252 are not.

In the example, a user has touched the dead front panel 104 at a location 254 within the display window area 202A with a finger, and has moved this finger leftward, per arrows 256, while still maintaining finger contact with the panel 104. Such interaction with the dead front panel 104 is referred to as a swiping gesture, in that the user swipes his or her finger along the panel 104. The user swipes his or her finger along a distance of the dead front panel 104 before lifting the finger from the panel 104, and further moves his or her finger at a variable speed while swiping the finger across the panel 104.

In FIG. 3B, therefore, the icons 252 that are visible within the display window area 202A correspondingly shift or scroll leftwards in accordance with the swiping gesture (i.e., in a direction corresponding to the direction of the swiping gesture). For instance, in FIG. 3B, ultimately the E, F, G, H, and I icons 252 are displayed within the display window area 202 of the dead front panel 104, such that the C and D icons 252 are no longer displayed as compared to in FIG. 3A. The A, B, and J icons 252 remain not displayed in FIG. 3B.

The movement or scrolling of the icons 252 leftward is in correspondence with the swiping gesture. Therefore, the C, D, E, F, and G icons 252 move leftwards. As the C icon 252 is no longer displayed at the left of the display window area 202A, the H icon 252 is displayed at the right of the area 202A. As the D, E, F, G, and H icons 252 then move or scroll leftwards, the D icon 252 begins to no longer be displayed at the left of the display window area 202A, and the I icon 252 begins to be displayed at the right of the area 202A.

The speed at which the icons 252 move or scroll leftwards may correspond to the variable speed at which the user swipes his or her finger across the panel 104. The amount by which the icons 252 move or scroll leftwards—i.e., the number of the icons 252 that are no longer displayed and the number of the icons 252 that begin to be displayed—can also correspond to the swiping gesture. For example, the amount by which the icons 252 move or scroll leftwards may correspond to the distance across the dead front panel 104 along which the user swipes his or her finger. As another example, the amount by which the icons 252 move or scroll leftwards may correspond to how quickly the user performs the scripting gesture: the icons 252 may continue to move leftwards even after the user's finger is no longer in contact with the panel 104.

Figure 4:
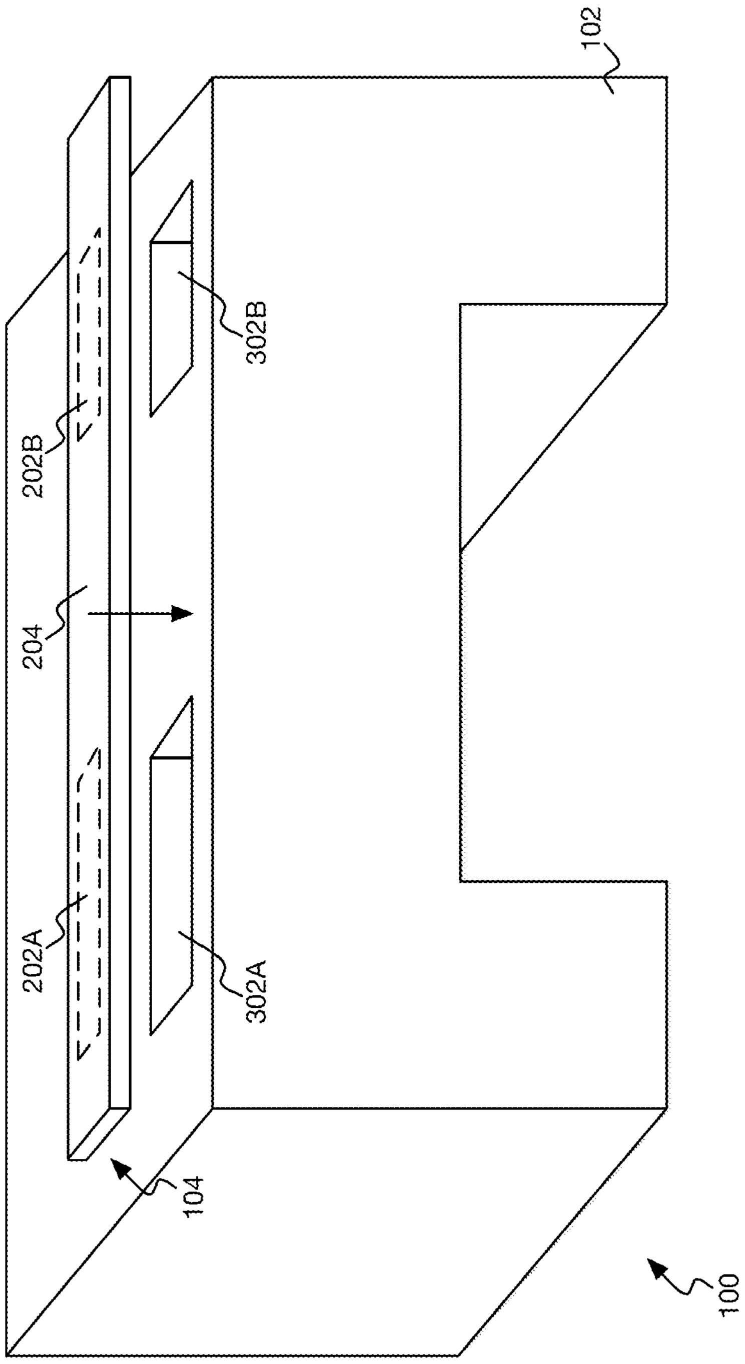
FIG. 4 is an exploded view diagram of an example dead front panel of the electronic device of FIG. 1 relative to an enclosure of the device.

FIG. 4 shows in exploded form the example dead front panel 104 relative to the enclosure 102 of the electronic device 100. The trays 106 and 108 and the lid 110 are not depicted in FIG. 4 for illustrative clarity and convenience. The enclosure 102 can include cavities 302A and 302B, collectively referred to as the cavities 302, corresponding to the display window areas 202A and 202B of the dead front panel 104, respectively. The non-display window area 204 of the dead front panel 104 is also identified in FIG. 4.

The cavities 302 may be slightly larger in size than their corresponding display window areas 202, as in the implementation depicted in FIG. 4. However, in other implementations, the cavities 302 may be the same size as or smaller in size than their corresponding display window areas 202. One or multiple display elements are able to be disposed within each cavity 302, which when illuminated emit light through the corresponding display window area 202 of the dead front panel 104.

Figure 5:
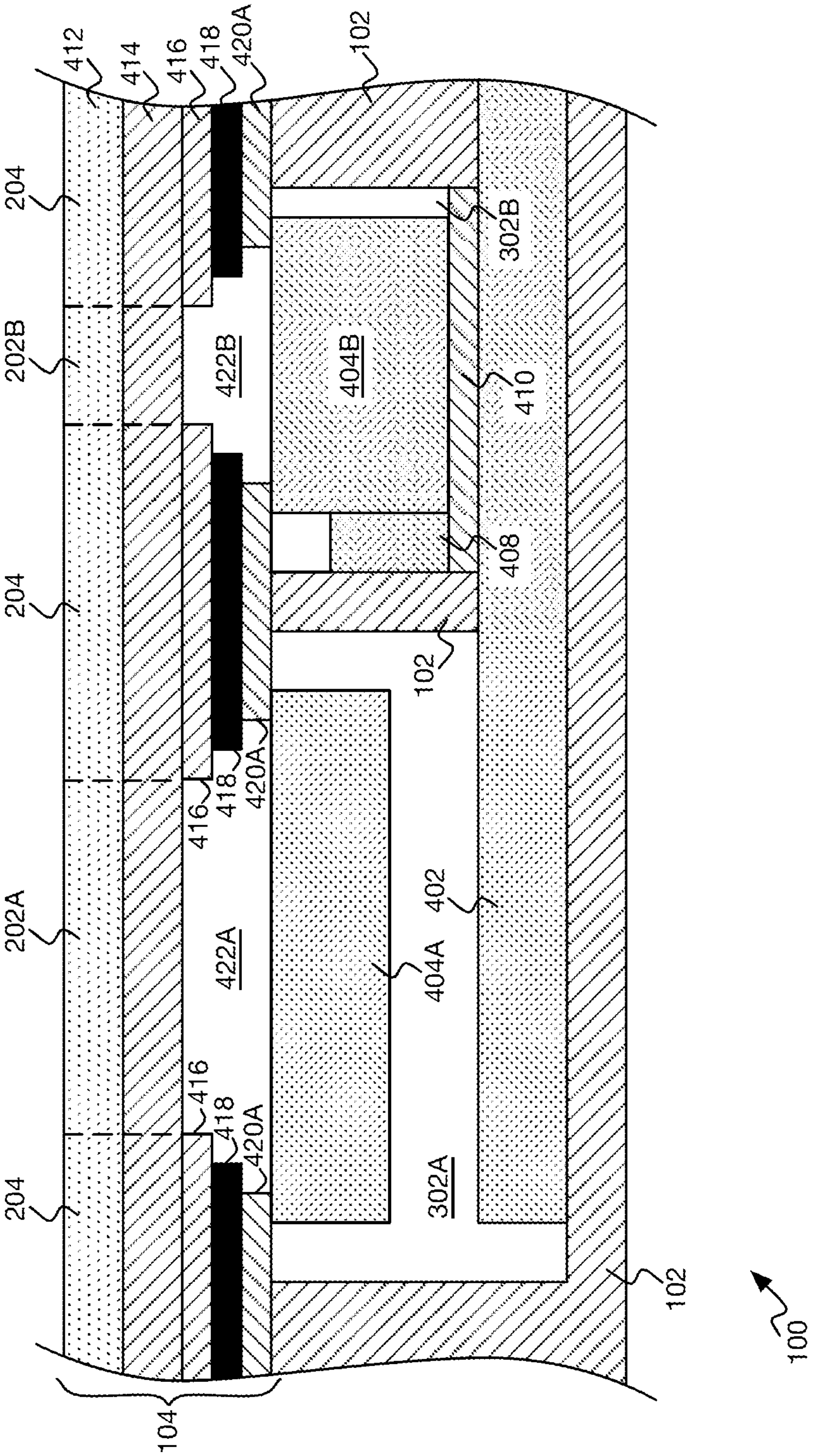
FIG. 5 is a cross-sectional view diagram of an example dead front panel mounted to an enclosure of an electronic device.

FIG. 5 shows the example dead front panel 104 in one implementation thereof, as mounted to the enclosure 102 of the electronic device 100, and thus which becomes (and corresponds to) a surface of the device 100. FIG. 5 is not to scale for illustrative clarity and convenience. A printed circuit assembly 402, such as a printed circuit board, may be disposed at the bottom of the interior of the enclosure 102. Display elements 404A and 404B, collectively referred to as the display elements 404, are respectively disposed within the cavities 302A and 302B of the enclosure 102. The printed circuit assembly 402 may drive the display elements 404, providing power to the elements 404 and providing for their control via suitable signals.

The display element 404A may be a touchscreen display element, such as a touchscreen FPD, that can display information by selectively emitting light and also receive user input. The display element 404A emits light through the display area 202A of the dead front panel 104. The display element 404B may be a touchscreen light guide that in addition to receiving user input can emit light received from an adjacent light-emitting unit 408 to which the display element 404B is optically coupled and which may be an LED. The display element 404B, which may be mounted to the printed circuit assembly 402 via an adhesive layer 410, specifically emits the light through the display window area 202B of the dead front panel 104.

The dead front panel 104 includes a transparent substrate 412. The transparent substrate 412 may be a transparent polycarbonate material, such as LEXAN polycarbonate material. The top, or front, surface of the transparent substrate 412 may be roughened or otherwise textured to match the texture of the external surfaces of the enclosure 102. That is, the transparent substrate 412 may be textured in correspondence with texture of the enclosure 102. The transparent substrate 412 may be available in already textured form, such as the case with LEXAN 8B35 polycarbonate material, which has a matte texture. The transparent substrate 412 may instead be glass, which is generally more expensive, heavier, and/or thicker than polycarbonate material.

The dead front panel 104 includes a first layer 414 of colorant, at the bottom, or back, surface of the transparent substrate 412 opposite the (textured) top, or front, surface of the substrate 412 and that is closer to the display elements 404 than this latter surface. The first layer 414 of colorant is also referred to as the first colorant layer 414, and is applied to the back surface of the transparent substrate 412 at both the display window areas 202 and the non-display window area 204, such as via silkscreening (in which case the layer 414 is a silkscreened layer). The first colorant layer 414 has a thickness that in combination with the transmittance of the colorant permits visibility of the light emitted by the display elements 404 through the display window areas 202 when illuminated, and that obfuscates visibility of the display elements 404 through the display window areas 202 when not illuminated.

The dead front panel 104 further includes a second layer 416 of the same colorant as the first colorant layer 414 applied to the first colorant layer 414 at the non-display window area 204 and not at the display window areas 202. The second layer 416 is also referred to as the second colorant layer 416, and may also be applied by silkscreening (in which case the layer 416 is a silkscreened layer, too). The color of the colorant of the colorant layers 414 and 416 can match (i.e., correspond to) the color of the enclosure 102 of the electronic device, such as the color medium basalt. The second colorant layer 416 has a thickness that in combination with the thickness of the first colorant layer 414 and the transmittance of their colorant renders the non-display window area 204 to visibly match the display window areas 202 when the display elements 404 are not illuminated. (In another implementation, the second layer 416 may be of a different color of colorant than the first layer 414.)

In other words, the inventors have novelly determined that in some cases, the second colorant layer 416 may have to be present at the non-display window area 204 in addition to the first colorant layer 414 in order for the dead front panel 104 to have a seamlessly consistent color across the display window areas 202 and the non-display window area 204 when the display elements 404 are not illuminated. If the second colorant layer 416 is absent in these cases, the dead front panel 104 may visibly vary in brightness between the display window areas 202 and the non-display window area 204 when the display elements 404 are not illuminated. The second colorant layer 416, however, is not present at the display window areas 202 so that light emitted by the display elements 404 is visible through the display window areas 202. Furthermore the lighter the color of the colorant layers 414 and 416, the thicker the second colorant layer 416 may be, or there may be more than one second colorant layer 416.

The dead front panel 104 includes a layer 418 of black colorant applied to the second colorant layer 416, and thus at the non-display window area 204 and not at the display window areas 202. The layer 418 is referred to as the black layer 418 and the black colorant layer 418, and may be applied by silkscreening (in which case the layer 418 is also a silkscreened layer). The black colorant layer 418 may have minimal light transmittance. The thickness of the black colorant layer 418 and the minimal transmittance of the black colorant may assist the combined thickness of the colorant layers 414 and 416 and the transmittance of their colorant in ensuring that the display window areas 202 and the non-display window area 204 visibly match when the display elements 404 are not illuminated.

Furthermore, the thickness of the black colorant layer 418 and the transmittance of the black colorant obfuscate visibility of any element of the electronic device 100 through the non-display window area 204, regardless of whether either display element 404 is illuminated. In the example of FIG. 5, when the light-emitting unit 408 is illuminated, the unit 408 emits light that is guided by the display element 404B for emission through (and thus visible through) the display window area 202B, such that the display element 404B is itself also effectively illuminated and emits light. The thickness of the black colorant layer 418 and the transmittance of the black colorant ensures that the light emitted by the light-emitting unit 408 is not emitted through (and thus not visible through) the non-display window area 204.

The dead front panel 104 includes an adhesive layer 420A applied to the black layer 418, and thus at the non-display window area 204 and not at the display window areas 202. The adhesive layer 420A permits the dead front panel 104 to be mounted to the electronic device 100 at the enclosure 102 of the device 100. Because adhesive layer 420A is not applied at the display window area 204, the adhesive of the layer 420A may be non-transparent, where such non-transparent adhesive may be less expensive than transparent adhesive.

Because the adhesive layer 420A is not applied at the display window area 204, there are resulting air gaps 422A and 422B between respective display elements 404A and 404B and the first colorant layer 414, which are collectively referred to as the air gaps 422. In the implementation in which either or both display elements 404 are touchscreen display elements, the presence of the air gaps 422 can decrease sensitivity of the touchscreens, reduce the clarity of the display elements 404 through the display window areas 202, and/or render the dead front panel 104 susceptible to flexing at the areas 202. The implementation of FIG. 5, however, permits the air gaps 422 to be just 0.1 mm in thickness, reducing these effects.

The overall thickness of the described dead front panel 104 of FIG. 5 may be no greater than 2 millimeters (mm) in thickness. For example, the transparent substrate 412 may have a nominal thickness of 1.75 millimeters, and the first colorant layer 414 may have a thickness of 0.05 mm. The second colorant layer 416 and the black colorant layer 418 may each have a thickness of 0.025 mm, and the adhesive layer 420A may have a thickness of 0.05 mm.

Figure 6A:
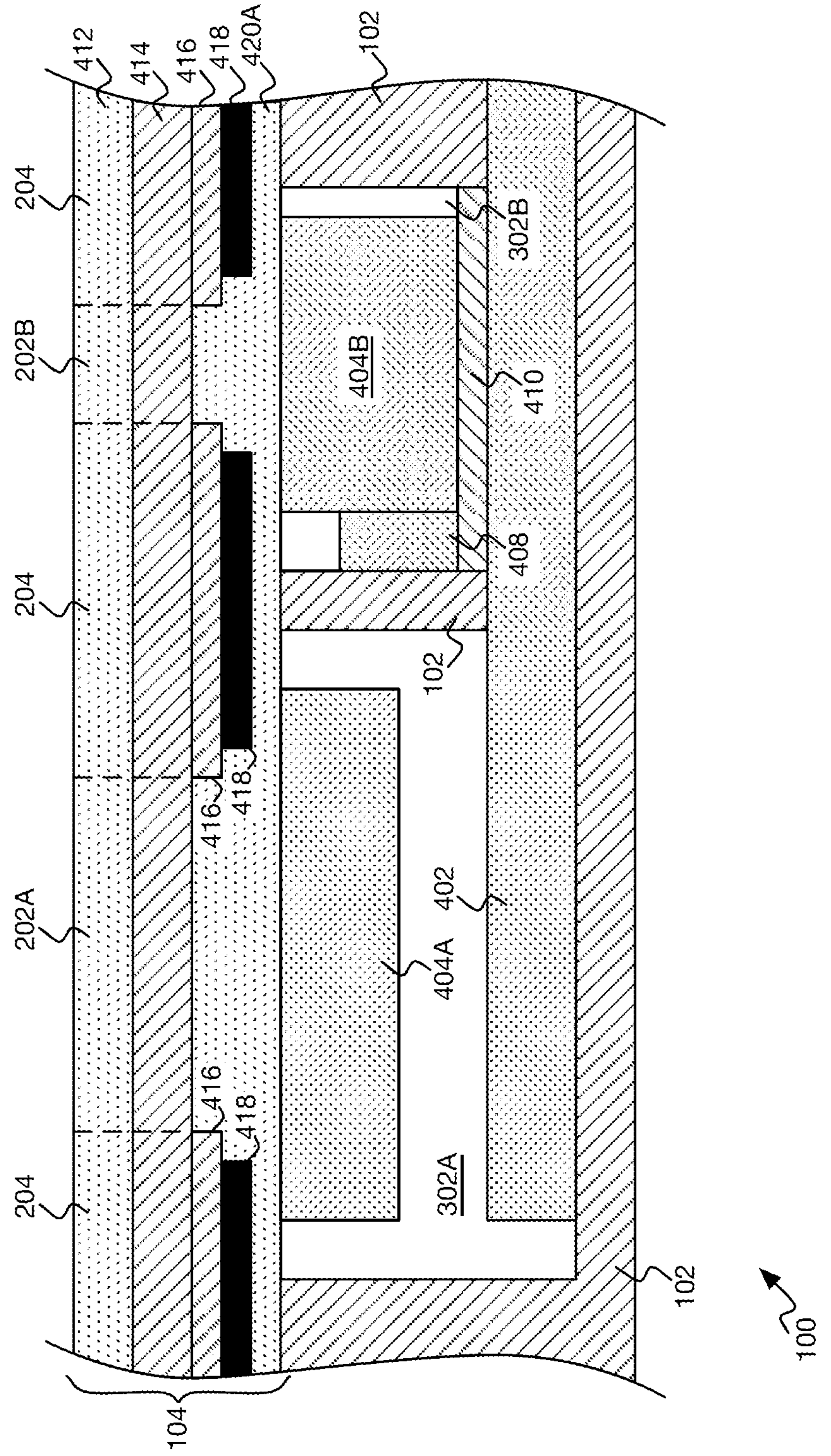
FIGS. 6A and 6B are cross-sectional view diagrams of the example dead front panel of FIG. 5 in different implementations as to the adhesive mounting the dead front panel to an enclosure of the electronic device.
Figure 6B:
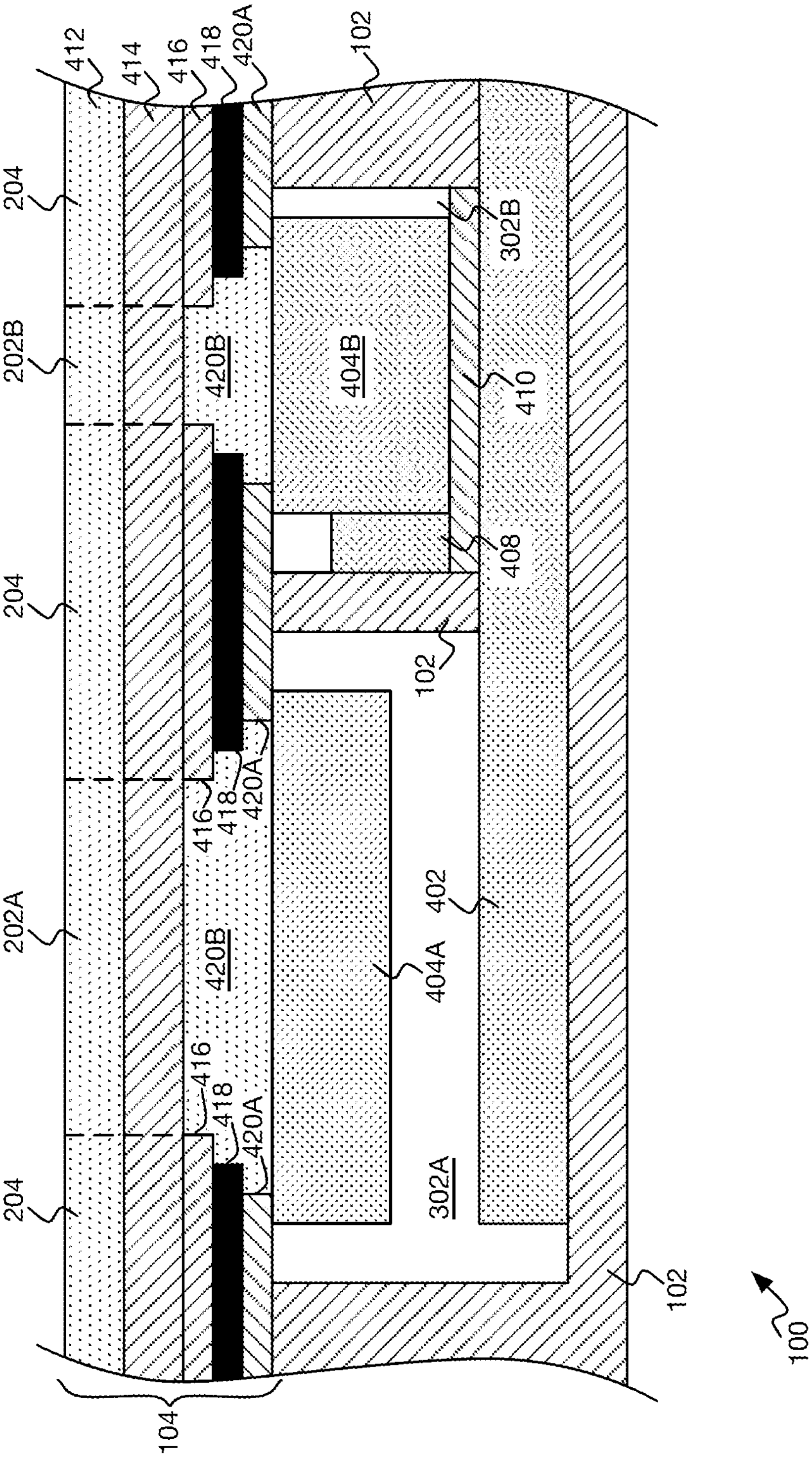

FIGS. 6A and 6B show the example dead front panel 104 in other implementations as to the adhesive mounting of the dead front panel to the enclosure 102 of the electronic device 100 and thus to the electronic device 100. The electronic device 100 below the dead front panel 104 is the same in FIGS. 6A and 6B as in FIG. 5. That is, the electronic device 100 in FIGS. 6A and 6B also includes the printed circuit assembly 402 disposed at the bottom of the interior of the enclosure 102, the display elements 404 disposed in respective cavities 302, and the light-emitting unit 408. However, unlike in the implementation of FIG. 5, the dead front panel 104 in the implementations of FIGS. 6A and 6B do not have air gaps 422 between the display elements 404 and the first colorant layer 414 of the dead front panel 104, on account of the differing adhesive mounting in these implementations.

In FIG. 6A, the dead front panel 104 has display window areas 202 and a non-display window area 204 as before, as well as a transparent substrate 412, first and second colorant layers 414 and 416, and a black colorant layer 418. However, the adhesive layer 420A is applied both to the black colorant layer 418 at the non-display area 204 and to the first colorant layer 414 at the display areas 202. The thickness of the adhesive layer 420A is greater at the display areas 202 than at the non-display area 204. Because the adhesive layer 420A is applied to the first colorant layer 414, there are no resulting air gaps 422 between the display elements 404 and the first colorant layer 414. However, the adhesive of the layer 420A has to be transparent, so that light emitted by the display elements 404 is visible through the display areas 202.

In FIG. 6B, the dead front panel 104 similarly has display window areas 202 and a non-display window area 204 as before, and a transparent substrate 412, first and second colorant layers 414 and 416, and a black colorant layer 418. The adhesive layer 420A is applied to just the black colorant layer 420A at the non-display area 204 as in FIG. 5 (and unlike in FIG. 6A), and not to the first colorant layer 414 at the display areas 202. The adhesive layer 420A, however, is a first adhesive layer 420A, and the dead front panel 104 also includes a second adhesive layer 420B applied to the first colorant layer 414 at the display areas 202 in FIG. 6B. The first adhesive layer 420A and the second adhesive layer 420B are collectively referred to as the adhesive layers 420.

The adhesive of the first layer 420A can be non-transparent since the first adhesive layer 420A is not applied at the display areas 202. By comparison, the adhesive of the second layer 420B is transparent since the second adhesive layer 420B is applied at the display areas 202. Because the second adhesive layer 420B is applied to the first colorant layer 414, there are no air gaps 422 between the display elements 404 and the first colorant layer 414 in FIG. 6B, as in FIG. 6A.

Figure 7A:
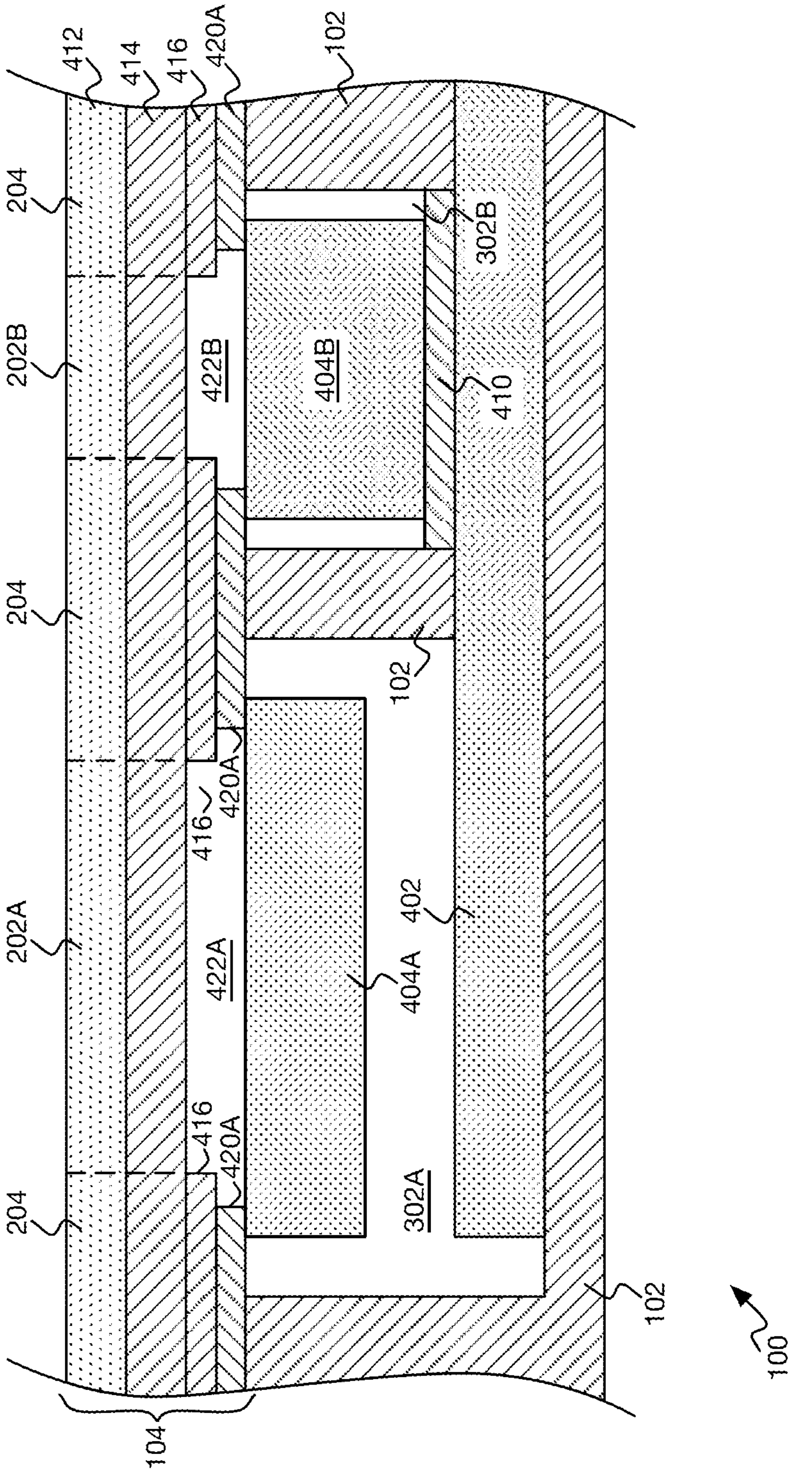
FIGS. 7A, 7B, and 7C are cross-sectional view diagrams of the example dead front panel of FIG. 5 in different implementations as to the colorant and black colorant layers of the dead front panel.
Figure 7B:
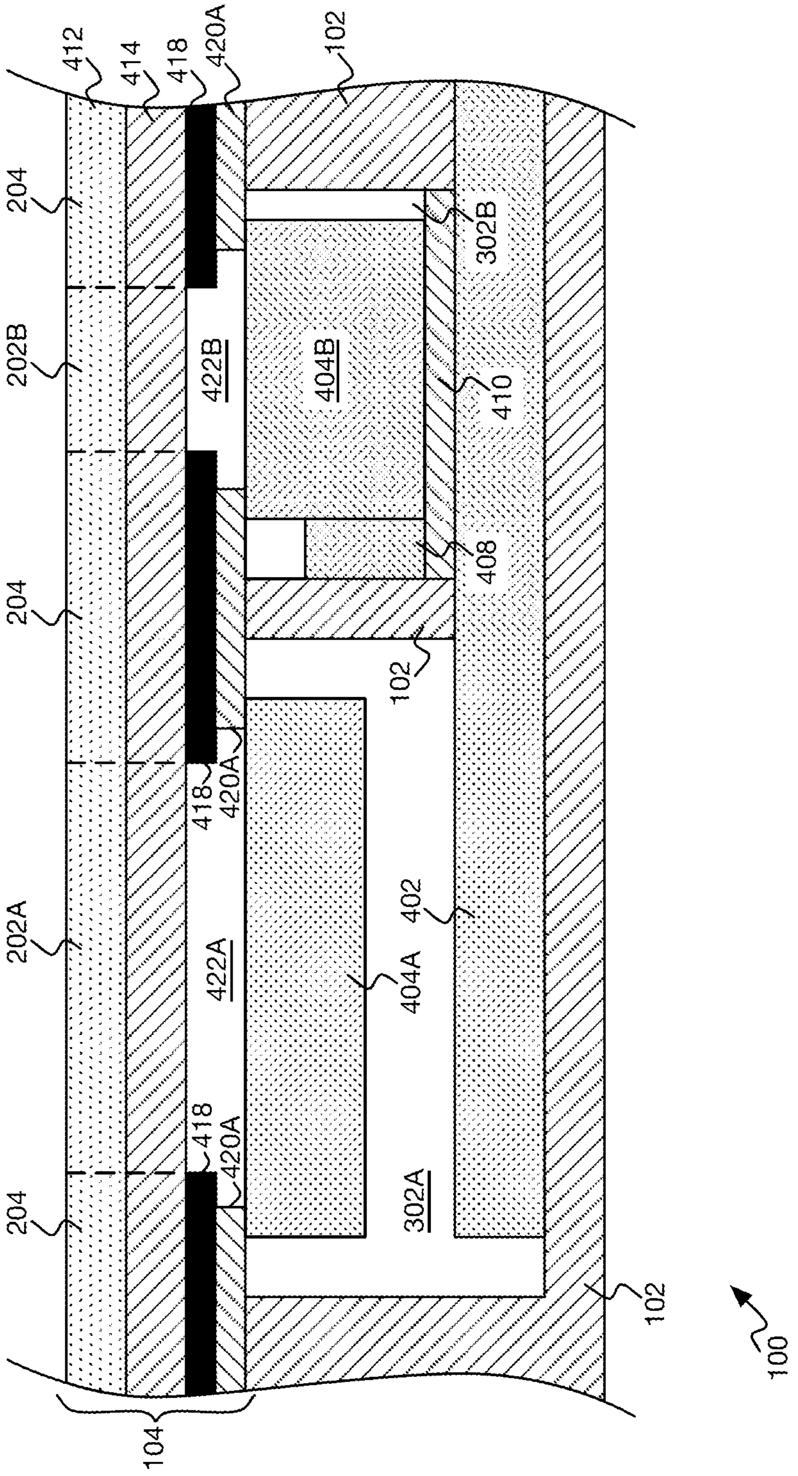
Figure 7C:
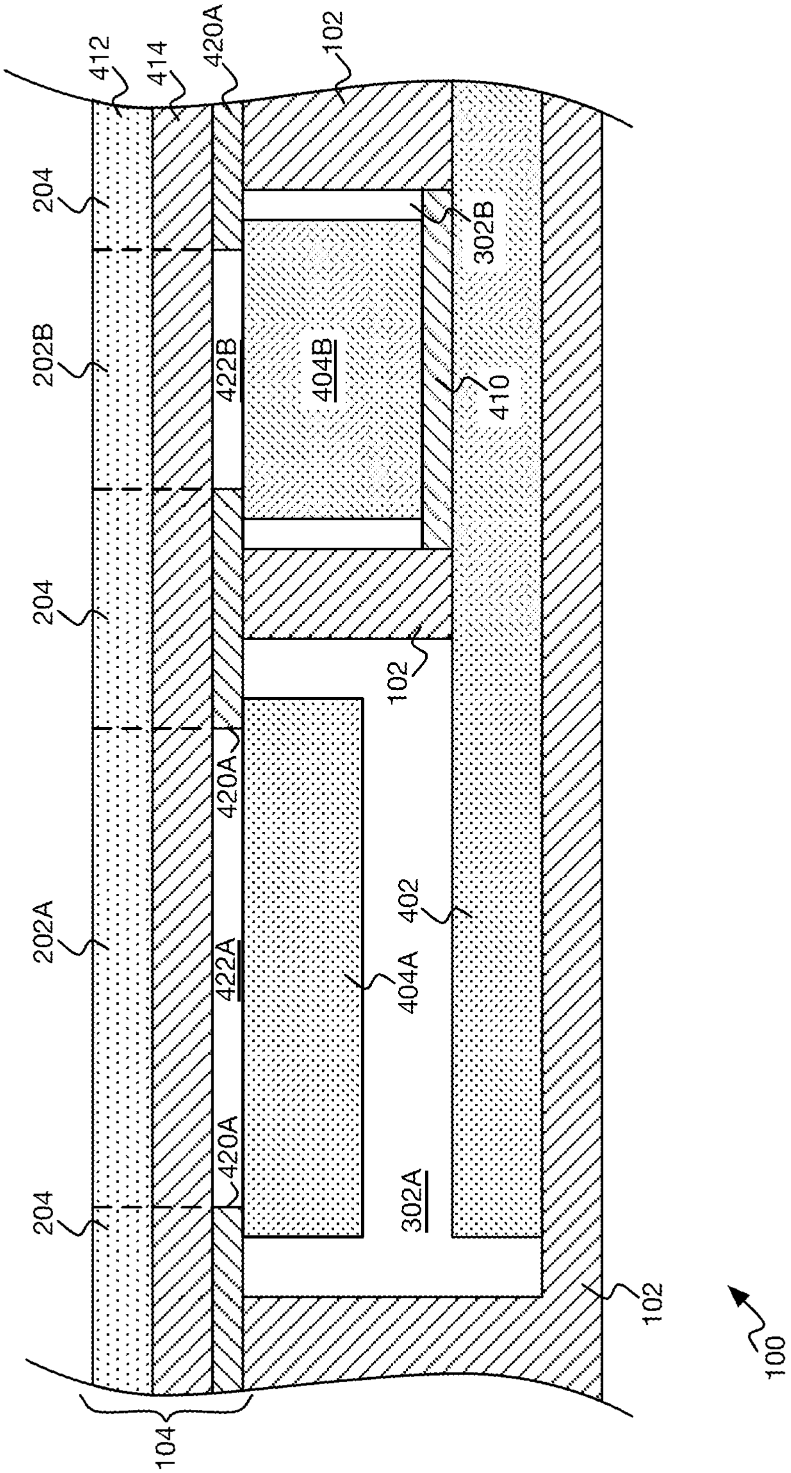

FIGS. 7A, 7B, and 7C show the example dead front panel 104 in other implementations as to the second colorant layer 416 and the black colorant layer 418. The adhesive mounting of the dead front panel 104 to the enclosure 102 of the electronic device 100 and thus to the electronic device 100 in FIGS. 7A, 7B, and 7C is the same as in FIG. 5. However, in other implementations, the adhesive mounting in FIGS. 7A, 7B, and 7C can instead be consistent with the adhesive mounting in FIG. 6A or 6B.

In FIG. 7A, the electronic device 100 below the dead front panel 104 is the same as in FIG. 5 with respect to the printed circuit assembly 402 disposed in the bottom of the interior of the enclosure 102, and the display element 404A disposed in the cavity 302A. However, there is no light-emitting unit 408 in FIG. 7A. The display element 404B is correspondingly larger (i.e., wider), and therefore may instead include its own built-in light source. The display element 404B is mounted to the printed circuit assembly 402 via the adhesive layer 410 as before.

In FIG. 7A, the dead front panel 104 has display window areas 202 and a non-display window area 204 as before, as well as first and second colorant layers 414 and 416. However, there is no black colorant layer 418 in FIG. 7A, even though generally the black colorant layer 418 is usually included. For instance, because the light-emitting unit 408 is absent, the presence of the black colorant layer 418 may also not have to be present to ensure that light emitted by the light-emitting unit 408 is not visible through the non-display area 204. The adhesive layer 420A is instead applied to the second colorant layer 416 at the non-display area 204. Because the black colorant layer 418 is absent, the air gaps 422 between the first colorant layer 414 and the display elements 404 are shorter in height in FIG. 7A as compared to in FIG. 5.

In FIG. 7B, the electronic device 100 below the dead front panel 104 is the same as in FIG. 5. The printed circuit assembly 402 is disposed in the bottom of the interior of the enclosure 102, and the display elements 404 are disposed in their respective cavities 302. The display element 404B is mounted to the printed circuit assembly 402 via the adhesive layer 410 as before. The light-emitting until 408 is also present.

In FIG. 7B, the dead front panel 104 has display window areas 202 and a non-display window area 204 as before. While the dead front panel 104 includes the first colorant layer 414 and the black colorant layer 418, there is no second colorant layer 416 in FIG. 7B. For instance, if the color of the colorant of the layer 414 is sufficiently dark, then just the first colorant layer 414 (and not an additional second colorant layer 416 as well) may be sufficient to ensure that the color of the dead front panel 104 is seamless across the display window areas 202 and the non-display window area 204 when the display elements 404 are not illuminated.

The black colorant layer 418 is still included in FIG. 7B since the light-emitting unit 408 is present. The adhesive layer 420A is applied to the black colorant layer 418 at the non-display area 204 as in FIG. 5. However, because the second colorant layer 416 is absent, the air gaps 422 between the first colorant layer 414 and the display element 404 are shorter in height in FIG. 7B as compared to in FIG. 5.

In FIG. 7C, the electronic device 100 below the dead front panel 104 is the same as in FIG. 5 with respect to the printed circuit assembly 402 disposed in the bottom of the interior of the enclosure 102, and the display element 404A disposed in the cavity 302A. However, there is no light-emitting unit 408 in FIG. 7C. The display element 404B is correspondingly larger (i.e., wider), and therefore may instead include its own built-in light source. The display element 404B is mounted to the printed circuit assembly 402 via the adhesive layer 410 as before.

In FIG. 7C, the dead front panel 104 also has display window areas 202 and a non-display window area 204 as before. However, the dead front panel 104 includes just the first colorant layer 414—and neither the second colorant layer 416 nor the black colorant layer 418—in FIG. 7C. The second colorant layer 416 may be absent for the reasons described in relation to FIG. 7B, and the black colorant layer 418 may be absent for the reasons described in relation to FIG. 7A, although generally the black colorant layer 418 is usually included. The adhesive layer 420A is applied to the first colorant layer 414 at the non-display area 204. Because both the second colorant layer 416 and the black colorant layer 418 are absent, gaps 422 between the first colorant layer 414 and the display elements 404 are even shorter in height in FIG. 7C as compared to in FIG. 7A or 7B.

Figure 8:
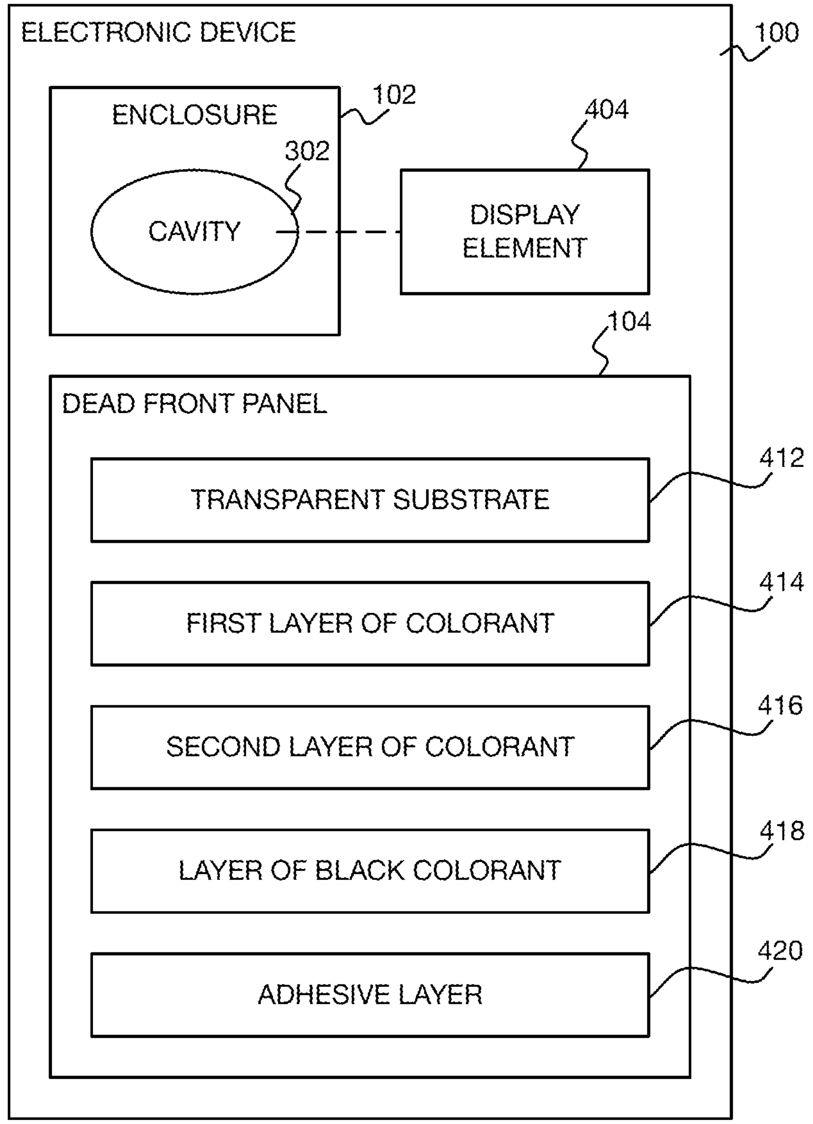
FIG. 8 is a block diagram of an example electronic device.

FIG. 8 shows a block diagram of an example electronic device 100. The electronic device 100 can include an enclosure 102, and a display element 404 disposed within a cavity 302 of the enclosure 102 that is emit light when illuminated. The electronic device 100 includes a dead front panel 104. The dead front panel 104 includes a transparent substrate 412 and a first layer 414 of colorant. The dead front panel 104 can include a second layer 416 of colorant and/or a layer 418 of black colorant. The dead front panel 104 includes an adhesive layer 420.

The first colorant layer 414 is applied to a back surface of the transparent substrate 412 at both a display window area 202 of the substrate 412 through which the light is emitted by the display element 404 when illuminated and at a non-display window area 204 of the substrate 412. The first colorant layer 414 has a thickness that in combination with a transmittance of the colorant permits visibility of the light emitted by the display element 404 when illuminated and obfuscates visibility of the display element 404 when not illuminated.

The second colorant layer 416 is applied to the first colorant layer 414 at the non-display window area 204. The second colorant layer 416 has a thickness that in combination with the thickness of the first colorant layer 414 and the transmittance of the colorant renders the non-display window area 204 to visibly match the display window area 202 when the display element 404 is not illuminated.

The black colorant layer 418 is applied to the second colorant layer 416 if present or otherwise to the first colorant layer 414 if the second colorant layer 416 is absent, at the non-display area 204. The black colorant layer 418 has a thickness that in combination with the transmittance of the black colorant obfuscates visibility of any light-emitting element through the non-display window area 204.

The adhesive layer 420 adheres the transparent substrate 412 to the enclosure 102. If the black colorant layer 418 is present, the adhesive layer 420 is applied to the black colorant layer 418, and can also be applied to the first colorant layer 414. If the black colorant layer 418 is not present but the second colorant layer 416 is present, the adhesive layer 420 is applied to the second colorant layer, and can also be applied to the first colorant layer 414. If neither the black colorant layer 418 nor the second colorant layer 416 is present, the adhesive layer 420 is applied to the first colorant layer 414.

Figure 9:
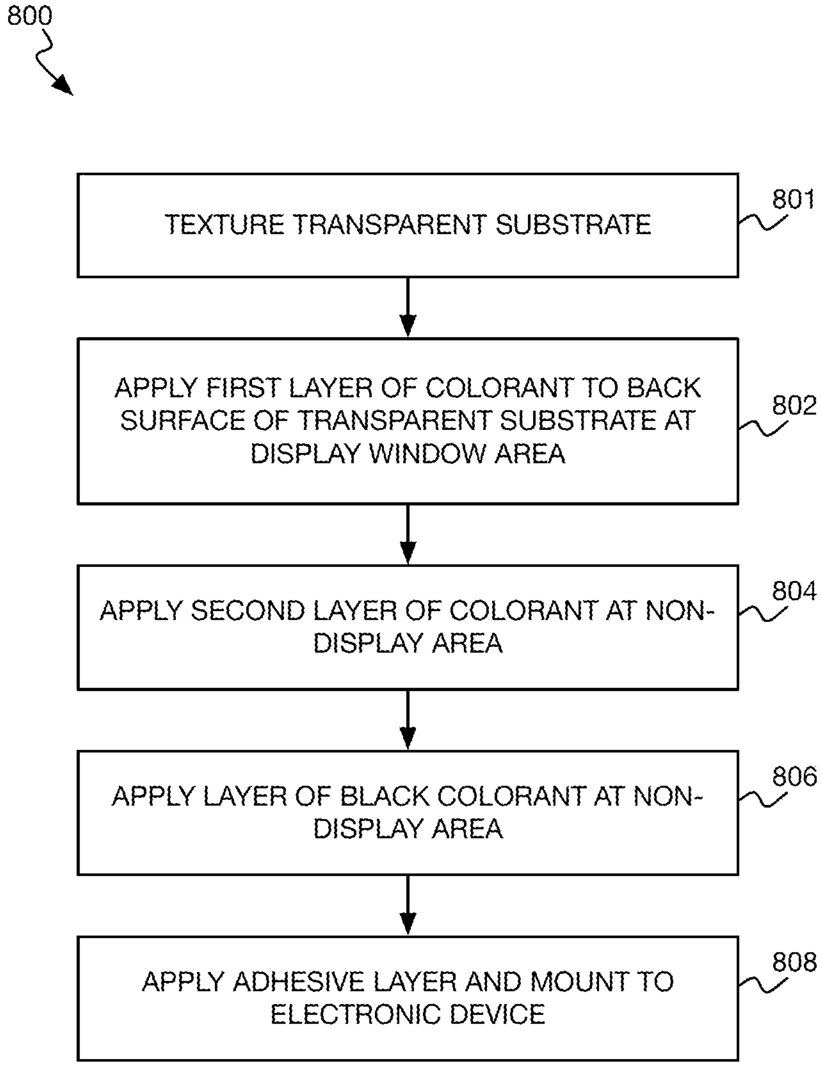
FIG. 9 is a flowchart of an example method for manufacturing a dead front panel and mounting the dead front panel to an enclosure of an electronic device.

FIG. 9 shows an example method 800. The method 800 can include texturing a front surface of a transparent substrate 412 in correspondence with a texture of an enclosure 102 of an electronic device 100 (801). The method 800 includes applying a first layer 414 of colorant to a back surface of the transparent substrate 412 both at a display window area 202 through which light is emitted by a display element 404 of the electronic device 100 when illuminated and at a non-display window area 204 (802). The thickness of the first colorant layer 414 in combination with a transmittance of the colorant permits visibility of the light emitted by the display element 404 when illuminated and obfuscates visibility of the display element 404 when not illuminated.

The method 800 can include applying a second layer 416 of colorant to the first layer 416 at the non-display area 204 (804). The thickness of the second colorant layer 416 in combination with the thickness of the first layer 414 and the transmittance of the colorant renders the non-display window area 204 to visibly match the display window area 202 when the display element 404 is not illuminated. The method 800 can include applying a layer 418 of black colorant to the second colorant layer 416 at the non-display area 204 (806). The transmittance of the black colorant layer 418 obfuscates visibility of any element through the non-display window area 204, regardless of whether the display element 404 is illuminated. The method 800 can include applying an adhesive layer 420 and mounting the transparent substrate 412 to the electronic device 100 (808). The adhesive layer 420 adhesively secures the transparent substrate 412 to the electronic device 100.

Figure 10:
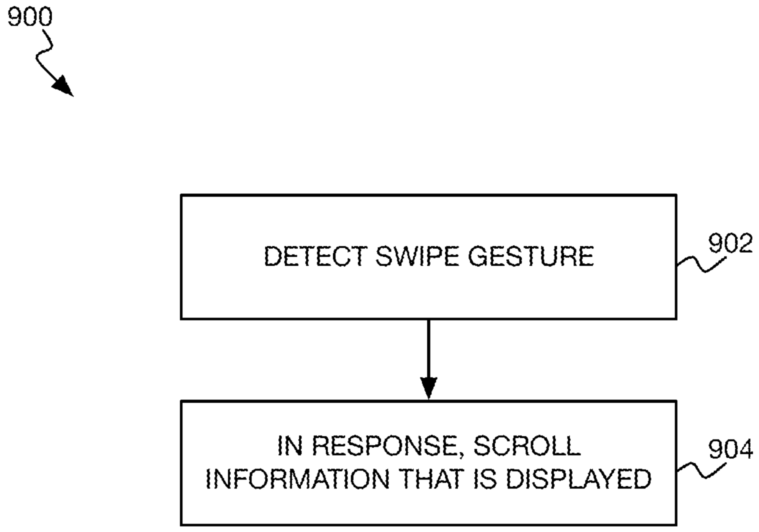
FIG. 10 is a flowchart of an example method for using a dead front panel under which a pixel-based touchscreen display element is disposed.

FIG. 10 shows an example method 900. The method 900 includes detecting a swipe gesture on a dead front panel 104 under a display window area 202A of which a pixel-based touchscreen display element is disposed (902). The dead front panel 104 has a transparent substrate 412 and a layer 414 of colorant applied to a back surface of the transparent substrate 412. The thickness of the layer 414 in combination with a transmittance of the colorant permits visibility of light emitted by the pixel-based touchscreen display element when illuminated and obfuscating visibility of the pixel-based touchscreen display element when not illuminated. The method 900 includes, in response to detecting the swipe gesture, scrolling information displayed by the pixel-based touchscreen display element through the display window area 202A of the dead front panel 104 in correspondence with the swipe gesture (904).

Dead front panels have been described. The described dead front panels sufficiently obfuscate visibility of the display elements when the elements are not illuminated, while adequately permitting their visibility when the display elements are illuminated. The described dead front panels are sufficiently thin and are positioned sufficiently close to their underlying display elements, with a minimal air gap between the elements and the panels, to not impair the user experience of the electronic devices of which the panels are a part. As a result, the dead front panels can be employed in conjunction with touchscreen display elements that specifically include addressable pixel-based display elements, such as FPDs, which heretofore has generally not been achieved. The described dead front panels can further be relatively low in cost, permitting their usage in devices even when cost is a concern.

We claim:

1. A dead front panel for an electronic device, comprising:

a transparent substrate corresponding to a surface of the electronic device, having a display window area through which light is emitted by a display element of the electronic device when the display element is illuminated, and having a non-display window area; and a silkscreened layer of colorant applied to a back surface of the transparent substrate at both the display window area and the non-display window area, a thickness of the layer in combination with a transmittance of the colorant permitting visibility of the light emitted by the display element when illuminated and obfuscating visibility of the display element when not illuminated, wherein the display element is an addressable pixel-based touchscreen display element.

2. The dead front panel of claim 1, wherein the layer is a first layer of the colorant, the dead front panel further comprising:

a second layer of the colorant applied to the first layer at the non-display window area, a thickness of the second layer in combination with the thickness of the first layer and the transmittance of the colorant rendering the non-display window area to visibly match the display window area when the display element is not illuminated.

3. The dead front panel of claim 2, further comprising:

a black layer of colorant applied to the second layer at the non-display window area, a transmittance of the black colorant obfuscating visibility of any element through the non-display window area, regardless of whether the display element is illuminated.

4. The dead front panel of claim 3, further comprising:

an adhesive layer applied to the black layer to adhere the transparent substrate to the electronic device at the non-display window area, wherein the adhesive layer is not applied to the first layer, resulting in an air gap at the display window area between the first layer and the display element.

5. The dead front panel of claim 3, further comprising:

a first adhesive layer of a first adhesive applied to the black layer to adhere the transparent substrate to the electronic device at the non-display window area; and a second adhesive layer of a second adhesive applied to the first layer to adhere the transparent substrate to the electronic device at the display window area, resulting in no air gap at the display window area between the first layer and the display element, the second adhesive being transparent and different than the first adhesive.

6. The dead front panel of claim 3, further comprising:

a transparent adhesive layer applied to both the first layer and the black layer to adhere the transparent substrate to the electronic device at both the display window area and the non-display window area, resulting in no air gap at the display window area between the first layer and the display element.

7. The dead front panel of claim 3, wherein the first and second layers and the black layer are each a silkscreened layer of the colorant.

8. The dead front panel of claim 1, wherein the color of the colorant corresponds to a color of an enclosure of the electronic device.

9. The dead front panel of claim 8, wherein the transparent substrate has a front surface opposite the back surface and that is textured in correspondence with a texture of the enclosure, the back surface closer to the display element than the front surface.

10. The dead front panel of claim 9, wherein the transparent substrate comprises a transparent polycarbonate substrate.

11. An electronic device comprising:

an enclosure;

a display element disposed within a cavity of the enclosure and to emit light when illuminated;

a transparent substrate having a display window area through which the light is emitted by the display element when illuminated;

a first silkscreened layer of colorant applied to a back surface of the transparent substrate at both the display window area and a non-display window area of the transparent substrate, a thickness of the first layer in combination with a transmittance of the colorant permitting visibility of the light emitted by the display element when illuminated and obfuscating visibility of the display element when not illuminated;

a second layer of the colorant applied to the first layer at the non-display window area, a thickness of the second layer in combination with the thickness of the first layer and the transmittance of the colorant rendering the non-display window area to visibly match the display window area when the display element is not illuminated; and an adhesive layer to adhere the transparent substrate to the enclosure.

12. The electronic device of claim 11, wherein the display element comprises an addressable pixel-based touchscreen display element.

13. The electronic device of claim 11, wherein the display element comprises a light guide optically coupled to a light-emitting element disposed within a cavity of the enclosure to which the non-display window area corresponds, the electronic device further comprising:

a black layer of colorant applied to the second layer at the non-display area, a transmittance of the black colorant obfuscating visibility of the light-emitting element through the non-display window area.

14. The electronic device of claim 13, wherein the adhesive layer is either: applied to the black layer and not to the first layer to adhere the transparent substrate to the enclosure at the non-display area and not at the display area, resulting in an air gap at the display window area between the first layer and the display element;

applied to both the first layer and the black layer to adhere the transparent substrate to the enclosure at both the display and non-display areas, resulting in no air gap at the display window area between the first layer and the display element, the adhesive layer being transparent; or a first layer of a first adhesive applied to the black layer and not to the first layer to adhere the transparent substrate to the enclosure at the non-display area, the electronic device further comprising a second layer of a second adhesive applied to the first layer to adhere the transparent substrate to the enclosure at the display area, resulting in no air gap at the display window area between the first layer and the display element, the second adhesive being transparent.

15. A method comprising:

detecting a swipe gesture on a dead front panel under a display window area of which a pixel-based touchscreen display element is disposed, the dead front panel having a transparent substrate and a layer of colorant applied to a back surface of the transparent substrate, a thickness of the layer in combination with a transmittance of the colorant permitting visibility of light emitted by the pixel-based touchscreen display element when illuminated and obfuscating visibility of the pixel-based touchscreen display element when not illuminated;

and in response to detecting the swipe gesture, scrolling information displayed by the pixel-based touchscreen display element through the display window area of the dead front panel in correspondence with the swipe gesture.

* * * * *